United States Patent
Theimer et al.

(10) Patent No.: US 10,465,475 B2
(45) Date of Patent: Nov. 5, 2019

(54) HYDRAULIC PULSE VALVE WITH IMPROVED WEAR LIFE AND PERFORMANCE

(71) Applicant: TEMPRESS TECHNOLOGIES, INC., Renton, WA (US)

(72) Inventors: Anthony R. Theimer, Auburn, WA (US); Jack J. Kolle, Seattle, WA (US)

(73) Assignee: Tempress Technologies, Inc., Renton, WA (US)

( * ) Notice: Subject to any disclaimer, the term of this patent is extended or adjusted under 35 U.S.C. 154(b) by 153 days.

(21) Appl. No.: 15/685,271

(22) Filed: Aug. 24, 2017

(65) Prior Publication Data

US 2018/0073327 A1   Mar. 15, 2018

Related U.S. Application Data

(60) Provisional application No. 62/394,478, filed on Sep. 14, 2016.

(51) Int. Cl.
| | |
|---|---|
| *E21B 28/00* | (2006.01) |
| *E21B 34/06* | (2006.01) |
| *E21B 21/10* | (2006.01) |
| *F16K 31/02* | (2006.01) |
| *E21B 47/18* | (2012.01) |

(Continued)

(52) U.S. Cl.
CPC ............... *E21B 34/06* (2013.01); *E21B 4/06* (2013.01); *E21B 21/10* (2013.01); *E21B 47/187* (2013.01); *F16K 1/00* (2013.01); *F16K 31/02* (2013.01); *F16K 31/1223* (2013.01); *G01V 1/137* (2013.01)

(58) Field of Classification Search
CPC ...... E21B 47/187; E21B 47/185; E21B 28/00; E21B 43/003
See application file for complete search history.

(56) References Cited

U.S. PATENT DOCUMENTS

| | | | | | |
|---|---|---|---|---|---|
| 3,066,690 | A | * | 12/1962 | Tausch | .................. E21B 43/122 137/155 |
| 4,067,350 | A | * | 1/1978 | Raggio | .................. E21B 43/123 137/155 |

(Continued)

*Primary Examiner* — Kipp C Wallace
(74) *Attorney, Agent, or Firm* — Morgan, Lewis & Bockius LLP

(57) ABSTRACT

Hydraulic pulses are produced each time that a pulse valve interrupts the flow of a pressurized fluid through a conduit. The pulse valve includes an elongate housing having an inlet configured to couple to the conduit to receive the pressurized fluid, and an outlet configured to couple to one or more tools. In the housing, a valve assembly includes a poppet reciprocating between open and closed positions, and a poppet seat, in which the poppet closes to partially block the flow of pressurized fluid through the valve. A bypass passage is configured to connect with a valve actuation vent port such that when the poppet closes the valve actuation pressure is less than the difference between the pressure up stream of the pulse valve and a pilot within the poppet moves between disparate positions to modify fluid paths within the valve. When the valve is open, a relatively lower pressure is produced by a Venturi effect as the fluid flows through a throat in the poppet seat, to provide a differential pressure used to move the pilot and poppet.

8 Claims, 16 Drawing Sheets

(51) Int. Cl.
*E21B 4/06* (2006.01)
*G01V 1/137* (2006.01)
*F16K 31/122* (2006.01)
*F16K 1/00* (2006.01)

(56) References Cited

U.S. PATENT DOCUMENTS

| | | | | |
|---|---|---|---|---|
| 6,237,701 B1 * | 5/2001 | Kolle | ............... | E21B 7/18 |
| | | | | 175/1 |
| 8,528,649 B2 * | 9/2013 | Kolle | ............... | E21B 21/10 |
| | | | | 166/373 |
| 8,869,916 B2 * | 10/2014 | Clausen | ............... | E21B 7/06 |
| | | | | 175/61 |
| 2013/0112427 A1 * | 5/2013 | Kolle | ............... | E21B 21/10 |
| | | | | 166/373 |

* cited by examiner

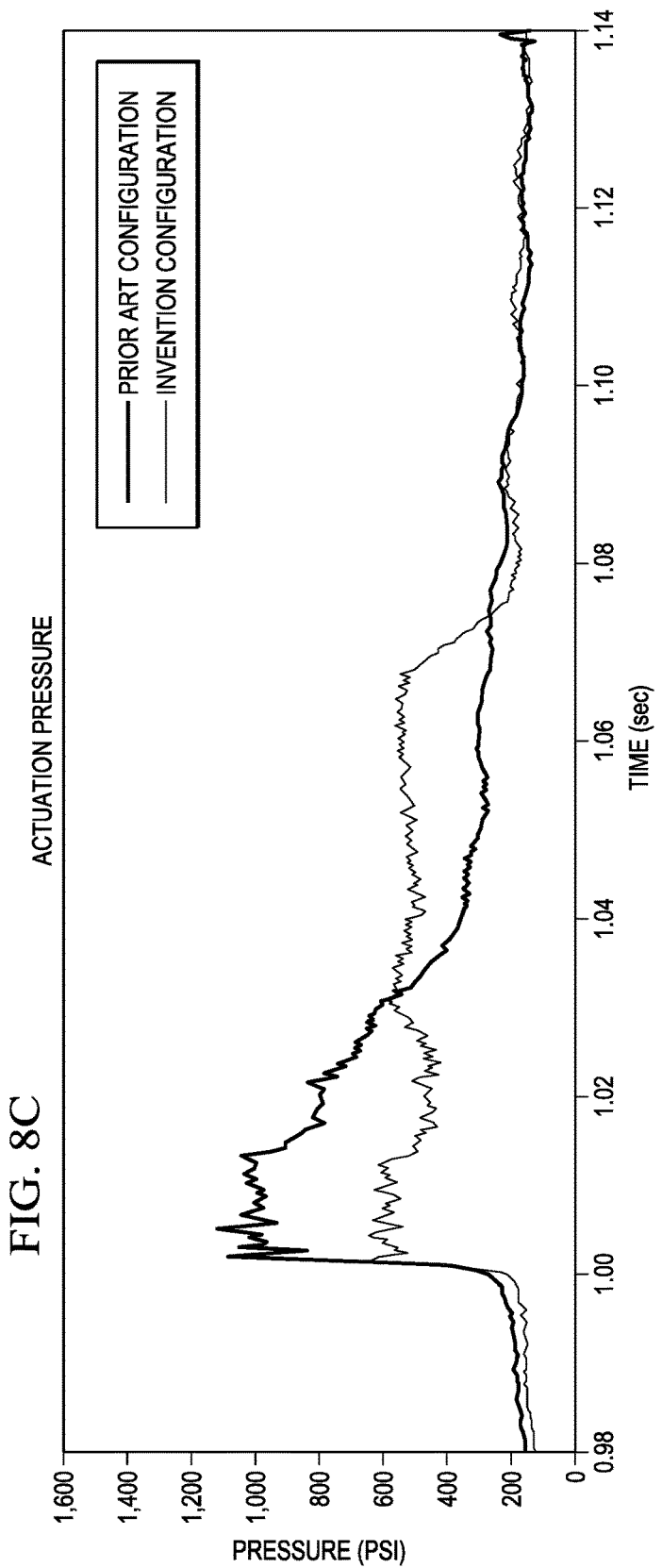

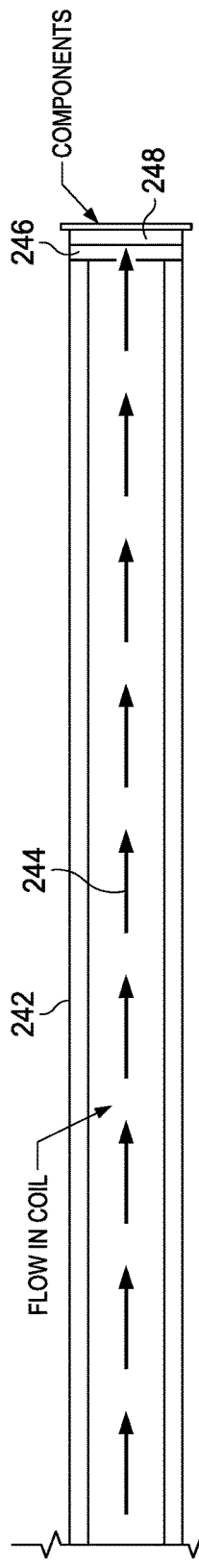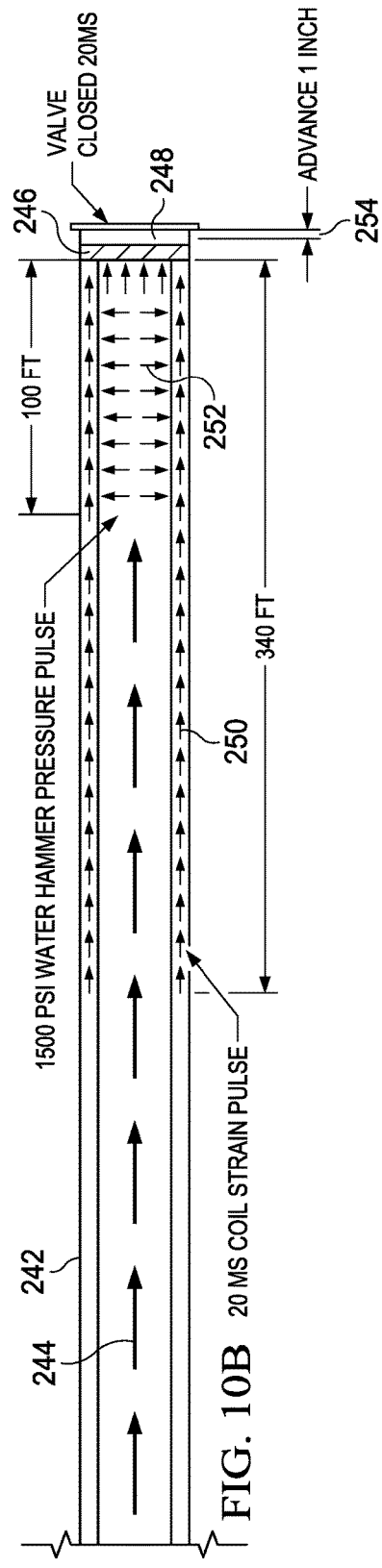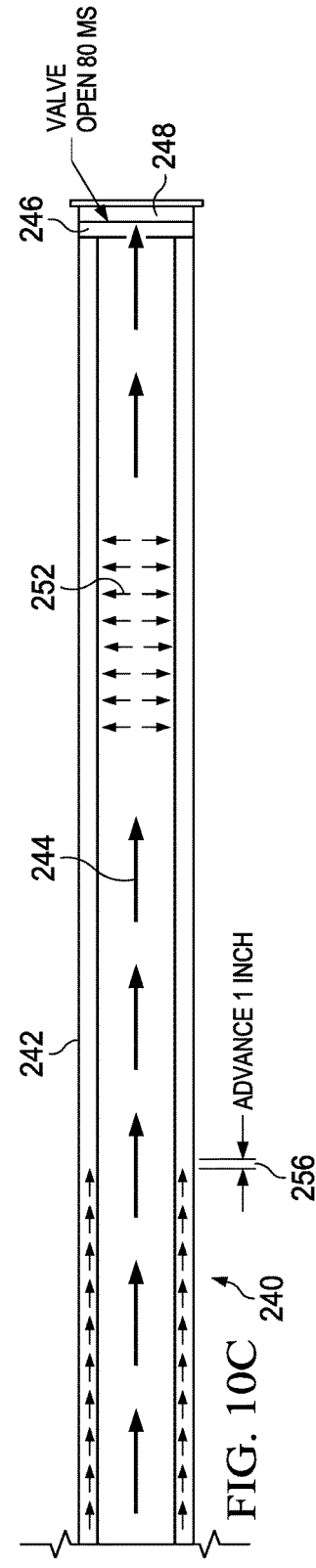

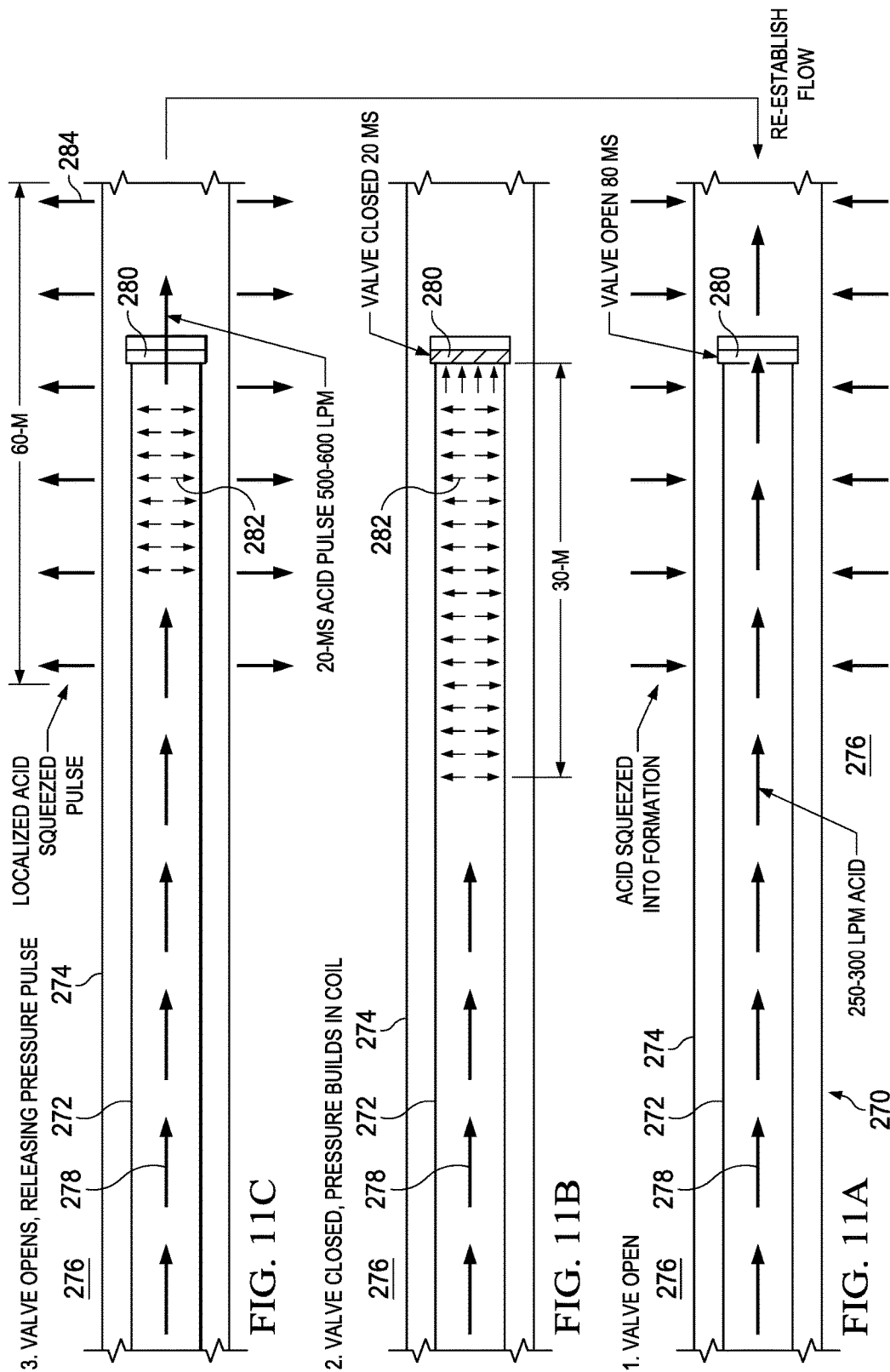

HYDRAULIC PULSE VALVE WITH IMPROVED WEAR LIFE AND PERFORMANCE

BACKGROUND

Fluid is commonly pumped though tubing inserted into a well to drill or to provide intervention services such as stimulation or milling of obstructions. Means for pulsing this flow have been developed for a variety of applications, including mud pulse telemetry, well stimulation, enhanced drilling, and for use in extending the lateral range of drilling motors or other well intervention tools. For example, U.S. Pat. Nos. 6,237,701 and 7,139,219, which are assigned to the same assignee of the present invention, disclose hydraulic impulse generators incorporating self-piloted poppet valves designed to periodically stop the flow of fluid at the bottom end of the tubing. Stopping the flow leads to an increase in pressure upstream of the valve and a decrease in pressure downstream of the valve. U.S. Pat. No. 6,237,701 describes a self-piloted self-cycling valve that creates water hammer pulses near the end of a drill string and suction pulses in the borehole. This pulse valve is envisioned to improve rate of penetration (ROP) and produce useful seismic waves while drilling.

U.S. Pat. No. 8,528,649 describes a similar pulse valve, but with improved pulse control. This valve incorporates a flow restriction that creates a differential pressure to drive valve actuation. Bypass passages can be added to reduce the intensity of the water hammer pulses as desired. These pulse valves are known to greatly improve lateral reach (effectively reducing friction coefficient) and improve weight transfer to the bit in coiled tubing purveyed applications. Additional benefits for directional drilling applications can include a reduction of stick-slip tubing behavior and improved tool face alignment.

Each of the devices described in the above-mentioned patents utilize cylindrical sliding clearance seals to isolate various annular cavities from one another. These clearance seals must have precise manufacturing tolerances in order to control leakage between the annular cavities. The usable life of the components that incorporate these clearance seals is limited primarily due to surface damage and wear caused by erosion. Hard, wear and erosion resistant materials can be used to prolong usable wear life, but longer wear life is desirable.

Drilling is normally done with sections of jointed tubing (drill pipe). Wells are routinely drilled to measured depths that exceed 15,000 ft. Since it takes significant time and effort to traverse the bottomhole assembly out of and into a wellbore of such a depth, best overall drilling efficiency is achieved by maximizing the length of runs. Drill bits, downhole motors, and other downhole components need to be able to survive at least 100 hours to be generally acceptable. Longer runs of as much as 200 hours are desirable.

It is also well known that when drilling mud experiences turbulence due to high velocity and or abrupt changes in direction, erosion will cause localized damage to components. The rate at which wear and damage occurs is primarily affected by localized velocities, abrasive solids content in the fluid, and material hardness. The fluid pumped down a drill pipe during drilling (drilling mud) contains bentonite and usually barite. Bentonite is a gelling agent that keeps relatively large particles in suspension. Barite is a weighting agent that increases the density of the fluid. Barite is comprised of tiny particles (up to 0.003") that are quite hard and abrasive. Fluid is normally pumped down the drill pipe, up the wellbore, and collected near the well at the surface. Fluid is normally cleaned using a variety of well-known means and recirculated through the system. Cuttings from the well such as sand and small rock fragments tend to stay in suspension and are usually even harder and more abrasive than the barite.

The presence of clearance seals, abrasive materials such as barite, and the need to continue to be effective for long periods of operation make for a very challenging combination of conditions for downhole pulse valves. The self-cycling pulse valves of the type described in the patents referenced above create a differential pressure that provides the motive force to operate. An orifice or Venturi is incorporated that partially restricts the primary flow path. The portion of the pulse valve cycle in which the clearance seals experience the highest differential pressure is while the valve is closed and the water hammer is occurring. The differential pressure across the valve during that period of time can be roughly ten times that which exists when the valve is open. Actuation does not require such a high pressure; it is merely the natural consequence of the water hammer operation.

It would thus be desirable to provide an apparatus and method for reducing the differential pressure through the internal passages and clearance seals primarily during the water hammer pulse. One benefit of such a solution would be to increase usable wear life of internal components for drilling application. Another benefit may include increasing controllability of the pulse duration with larger clearances than earlier devices provided. This can allow for longer duration pulses which are desirable. One alternative application of this invention can include self-piloted pulse valves used in non-drilling downhole applications.

Pressure pulsations in the tubing disposed upstream of the bottom hole assembly (BHA) can provide a plurality of beneficial effects. For example, the pulsations can improve the performance of rotary drilling by applying a cyclical mechanical load on the bit and a cyclic pressure load on the material that is being cut. In combination, these loads can enhance cutting. The vibrations induced by these cutting tools in the tubing can reduce the friction required to feed the tubing into long wells that deviate from a straight bore line.

The self-piloted poppet valve also generates pressure fluctuations in the wellbore near the tool. These pressure fluctuations can enhance chemical placement in the formation and enhance the production of formation fluids, such as oil or gas. In addition, the pressure pulses can also be used to generate a signal that can be employed for seismic processing. The pulses can be tuned to be an impulse with a cycle period longer than 1 second. This type of pulse is preferred for seismic interpretation, because the travel times of seismic waves in the earth crust for formations of interest, such as oil-and gas production, are on the order of seconds. The long period energy generated by this type of cyclic impulse that is produced by the present exemplary pulse valve also propagates long distances in the earth and is ideal for pore pressure prediction It would thus be desirable to provide an apparatus and method that allows for the reduction of differential pressure through the internal passages and clearance seals for pulse valves used in downhole applications, as compared to the differential pressure generated by existing pulse valve designs.

SUMMARY OF THE INVENTION

The following discussion discloses a novel pulse valve having improved wear life and performance when compared to previous designs. In accord with the present novel approach, one exemplary pulse valve that is used for producing pressure pulses within a conduit includes an elongate housing. The housing has an internal passage for conveying a pressurized fluid between an inlet disposed on one end of the housing and an outlet disposed on an opposite end of the housing. The inlet is configured to couple to a source of the pressurized fluid (which will normally be conveyed through a conduit), and the outlet is configured to provide the pressurized fluid flowing through the outlet to a component (such as another tool) that is coupled to the housing. A poppet seat is disposed adjacent to the outlet and includes a constricted throat. At least one port is disposed in the throat and is coupled in fluid communication with an internal volume. A valve assembly is also disposed within the elongate housing and includes a poppet that is reciprocally movable between a closed position in which it partially blocks pressurized fluid from flowing through the poppet seat, and an open position in which the pressurized fluid flows through the throat of the poppet seat. A pilot is disposed within the poppet and reciprocates between a disparate first and second position to alter fluid communication paths within the valve assembly. A plurality of fluid passages is configured to be in various fluid communication configurations, based upon positions of the pilot and of the poppet within the valve assembly. A bypass passage or passages which are connected to valve actuation vent ports are configured such that when the poppet is closed, the valve actuation pressure can be reduced. This allows for increased flow rate without increased wear on the components of the pulse valve assembly. Generally, the pilot and the poppet move in response to differential pressures developed in the valve assembly. For example, a differential pressure arises as a result of a higher pressure of the pressurized fluid within the internal passage and a relatively lower pressure produced in the at least one port in the throat and adjacent volume while the poppet is in the open position. The relatively lower pressure is produced in the at least one bypass passage by a Venturi effect as the pressurized fluid flows through the throat of the poppet seat when the poppet is in the open position.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 1A, 1B, 1C, and 1D are identical plan views of the bottom of an exemplary pulse valve in accord with the present novel approach;

FIG. 8C is a graph illustrating an exemplary actuation pressure comparison for the pulse valve configuration illustrated in FIGS. 2A-2D as compared to prior designs;

Figure 1A:
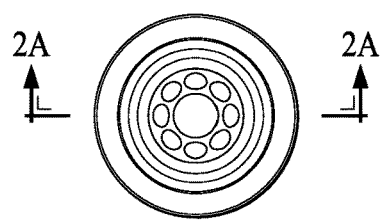

FIGS. 10A, 10B, and 10C are three schematic views showing how pressure pulses produced by the pulse valve are used to pull a conduit into a generally horizontal borehole; and FIGS. 11A, 11B, and 11C are three schematic views illustrating how pressure pulses are used to force acid conveyed through a conduit into a formation surrounding a well through which the conduit extends.

DESCRIPTION

The referenced figures and described embodiments are not intended to be limiting.

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Figure 2A:
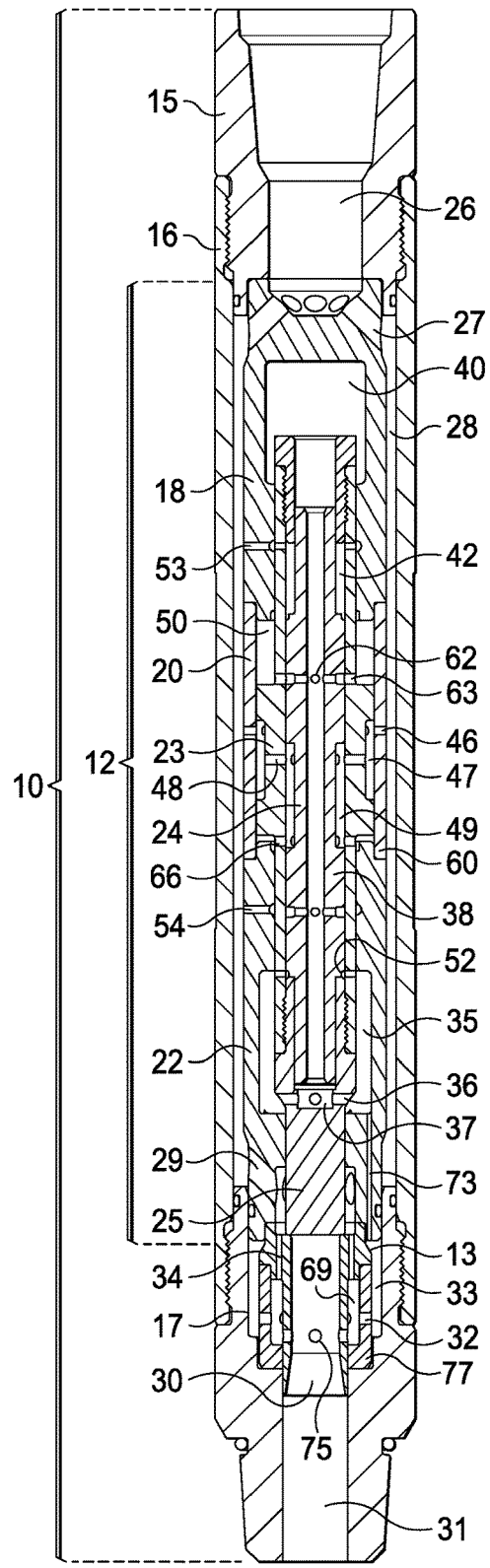
FIG. 2A is a longitudinal cross-sectional view of the pulse valve taken along section lines 2A-2A in FIG. 1A, wherein the pulse valve is shown in a closed state, with a pilot shown at its lowest position within a piston assembly of the pulse valve.
Figure 1B:
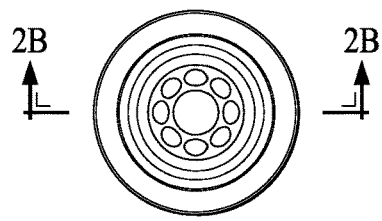

The characteristics and operation of the hydraulic pulse valve are best understood by examining its four sequential operational steps as illustrated in FIGS. 2A through 2D. A cross-sectional view of an exemplary hydraulic pulse valve with the poppet closed taken along section line A-A of FIG. 1A is illustrated in FIG. 2A. As shown therein, the valve basically includes a body 10, a valve cartridge 12, a poppet seat 13, and seat shell 77. Body 10 includes an inlet adapter 15, a housing 16, and an outlet adapter 17. The inlet and outlet adapters have threaded ends for serial connection into the bottomhole assembly as a part of a string of downhole tools. Valve cartridge 12 includes both stationary components and moving components. The stationary components include an upper manifold 18, a cylinder 20, and a lower manifold 22. The stationary components of the cartridge assembly, poppet seat 13, and seat shell 77 are clamped tight axially between inlet adapter 15 and outlet adapter 17. The moving parts of the cartridge include a piston assembly 23, and a pilot 24. The piston assembly moves axially between upper and lower shoulders inside the cartridge assembly. Major and minor outer cylindrical surfaces of the piston form slidable seals against the internal bores of the cartridge. Variable upper annular volume 50 and variable lower annular volume 60 are thus created between the piston and cartridge shoulders. The pilot moves axially between upper and lower shoulders within the piston assembly. Major and minor outer cylindrical surfaces of the pilot form slidable seals against the bores of the piston. Variable upper annular volume 42 and variable lower annular volume 52 are thus created between the pilot and piston shoulders. The piston and cartridge assemblies may comprise several pieces to facilitate efficient and low cost manufacturing of the pulse valve, generally as described in U.S. Pat. No. 7,139,219. The piston and cartridge assemblies shown in FIGS. 2A through 2D have been simplified to facilitate understanding of the function and operation of the hydraulic pulse valve. At the lower end of the piston assembly is a poppet 25 that moves between poppet seat 13 (the closed position) and the extent of travel. The extent of travel is defined by contact between the piston assembly 23 and upper manifold 18 in the open condition and contact between poppet 25 and poppet seat 13 in the closed condition. Piston assembly 23 moves in response to changing pressure conditions within the pulse valve and changes in the path of fluid communication within the pulse valve caused by the moving pilot.

Figure 2B:
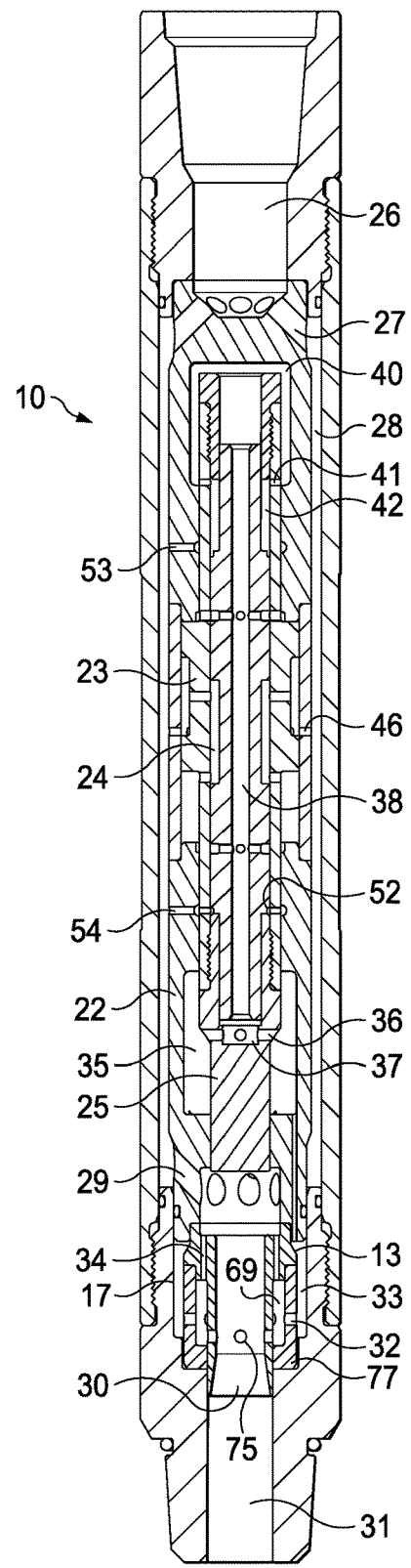
FIG. 2B is a longitudinal cross-sectional view of the pulse valve taken along section lines 2B-2B in FIG. 1B, wherein the pulse valve is shown in an open state, with the pilot shown at its lowest position within the piston assembly of the pulse valve.
Figure 1C:
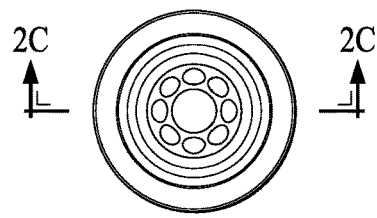

The hydraulic pulse valve is supplied with fluid from tubing connected at inlet adaptor 15. The fluid flows through a passage 26 in the center of inlet adapter 15, through passages 27 in upper manifold 18, and into an annular volume 28 that is annularly disposed between housing 16 and valve cartridge 12. Fluid flow is directed to the inside of lower manifold 22 though passages 29. In FIG. 2A, the pulse valve is shown in the closed position, with poppet 25 obstructing the fluid flow through a Venturi flow restriction 30 in poppet seat 13. Poppet seat 13 further incorporates bypass passages 34 and at least one secondary vent port 75, in an embodiment one or multiple vent ports may be configured. Notably, though poppet seat 13 is shown as a separate piece from seat shell 77, this was done for ease of manufacturing and these two components could be manufactured as one piece. It should also be noted that the term vent port as used herein can also be referred to as a drain passage and/or drain port. Seat shell 77 is disposed between poppet seat 13 and lower adapter 17 and incorporates primary vent ports 32. An intermediate volume 69, which is disposed between poppet seat 13 and seat shell 77, may be annular or other shapes as those skilled in the art would understand. Intermediate volume 69 is placed in fluid communication with Venturi flow restriction 30 through secondary vent ports 75. Intermediate volume 69 is also placed in fluid communication with annular passage 33 through primary vent ports 32. Flow passages 36 in poppet 25 communicate with an inside volume 37 of piston assembly 23 and through a central passage 38 in pilot 24. Lower manifold 22 incorporates passages 73 that connect annular passage 33 and volume 35. When the poppet is in the closed position, as shown in FIG. 2A, there is little flow downstream of the pulse valve, and the pressure is relatively low in flow restriction 30, outlet passage 31 and in tools disposed in the string below and distal of the pulse valve. Meanwhile, high pressure in annular passage 28 is transmitted through radial ports 46 in cylinder 20 to volume 47 and through radial ports 48 in the piston to volume 49 in the pilot. In this pilot position, lower variable volume 60 is exposed to the high pressure in annular volume 49 through radial ports 66 in the piston. Bypass flow must pass through bypass passages 34 to intermediate volume 69 and secondary vent ports 75. The total flow area of both 34 and 75 can be selected to present a flow restriction which causes the pressure in intermediate volume 69 to be elevated relative to the lower pressure in Venturi flow restriction 30. This intermediate pressure within intermediate volume 69 is communicated through primary vent ports 32, into annular passage 33, through passages 73, into annular volume 35, through passages 36, volume 37, and into central passage 38. In this pilot position, ports 62 in pilot are aligned with ports 63 in the piston assembly, thus communicating the intermediate pressure into upper variable volume 50. The differential pressure between variable volumes 50 and 60 causes piston assembly 23 (including poppet 25 and pilot 24) to move upwardly and open the pulse valve, to enable fluid flow through outlet passage 31, as illustrated in FIG. 2B. The arrangement of ports and passages and the principle of operation of the moving parts are similar to those described in U.S. Pat. No. 7,139,219 with additional features integrated into poppet seat 13 and seat shell 77.

A variation in this embodiment is to configure intermediate volume 69 large enough or in an appropriate shape to cause the jets of fluid emanating from bypass passages 34 when poppet 25 is in the closed position to effectively dissipate before the bypass fluid flow passes through secondary vent ports 75. This configuration can utilize the stagnation pressure of the aforementioned fluid flow to further increase the pressure within intermediate volume 69 and decrease the valve actuation pressure during the pulse.

The illustrated configurations of the pulse valve and poppet assembly provide further embodiments regarding the interconnection of the described passages connected in such a way that the pressurized region upstream of the poppet assembly causes a bypass fluid flow, when the poppet is closed, which elevates the pressure of an intermediate volume, the difference between the two being the valve actuation pressure. This has the effect of reducing the differential across the clearance seals during the water hammer pulse. This configuration also allows for the benefit that when the poppet is open, the vent pressure and thus the valve actuation pressure will be similar to that of the U.S. Pat. No. 8,528,649 described device. This can be accomplished because the poppet, upon closing, diverts the flow from the Venturi to the bypass passages. This diversion changes the flow dynamics sufficiently in this region of the device to accomplish said effects.

Figure 6A:
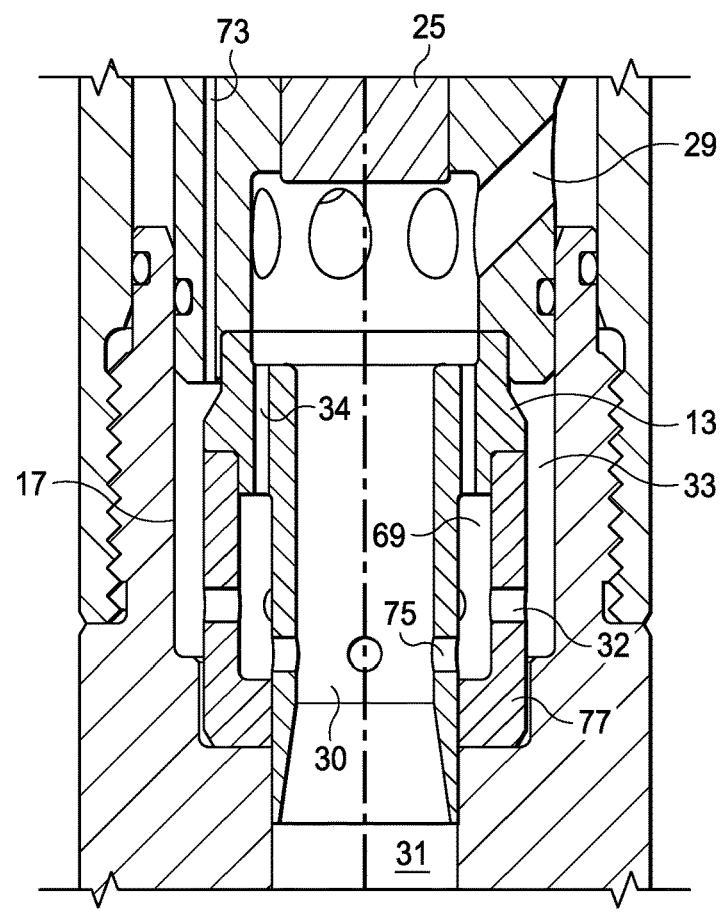
FIG. 6A is a longitudinal cross-sectional view of the pulse valve poppet section taken along section lines 6A-6A in FIG. 5A; wherein the poppet is in the open condition.
Figure 6B:
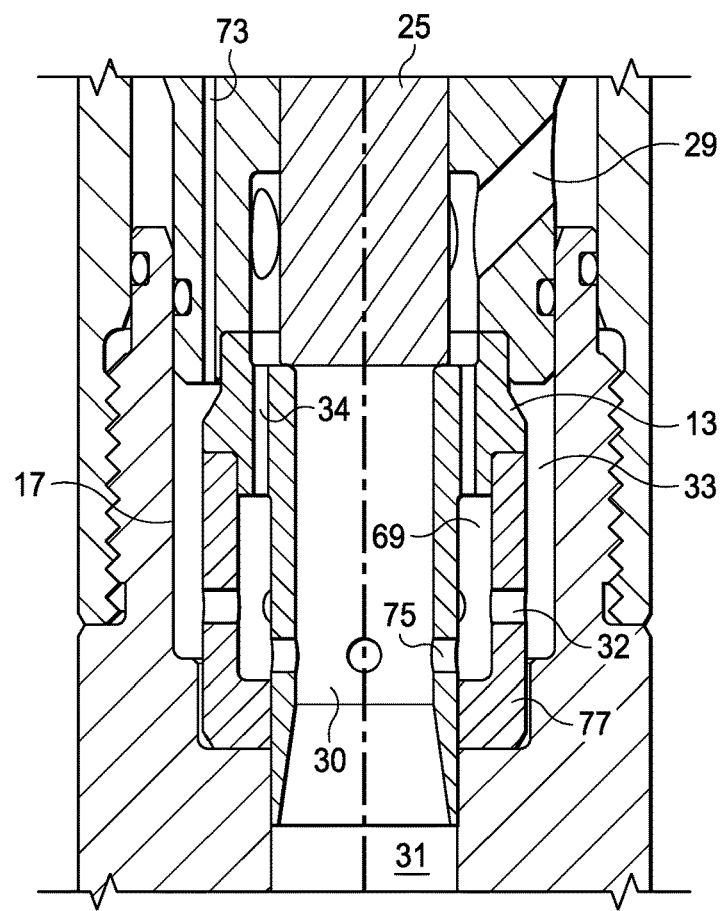
FIG. 6B is a longitudinal cross-sectional view of the pulse valve poppet section taken along section lines 6B-6B in FIG. 5B; wherein the poppet is in the closed condition.
Figure 6C:
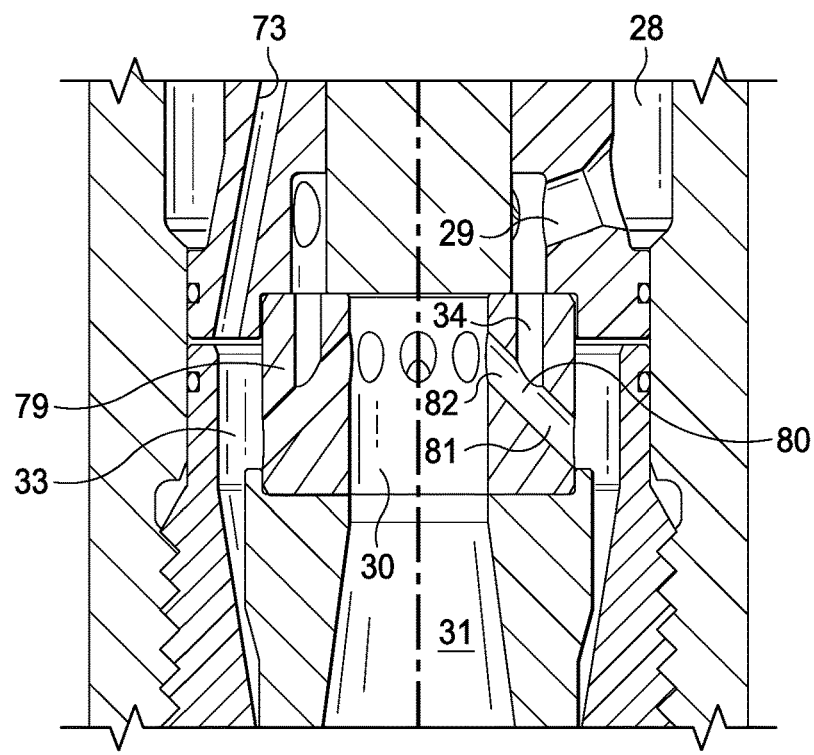
FIG. 6C is a longitudinal cross-sectional view of an alternative exemplary embodiment of the pulse valve poppet section taken along section lines 6C-6C in FIG. 5C; wherein the poppet is in the closed condition.
Figure 5D:
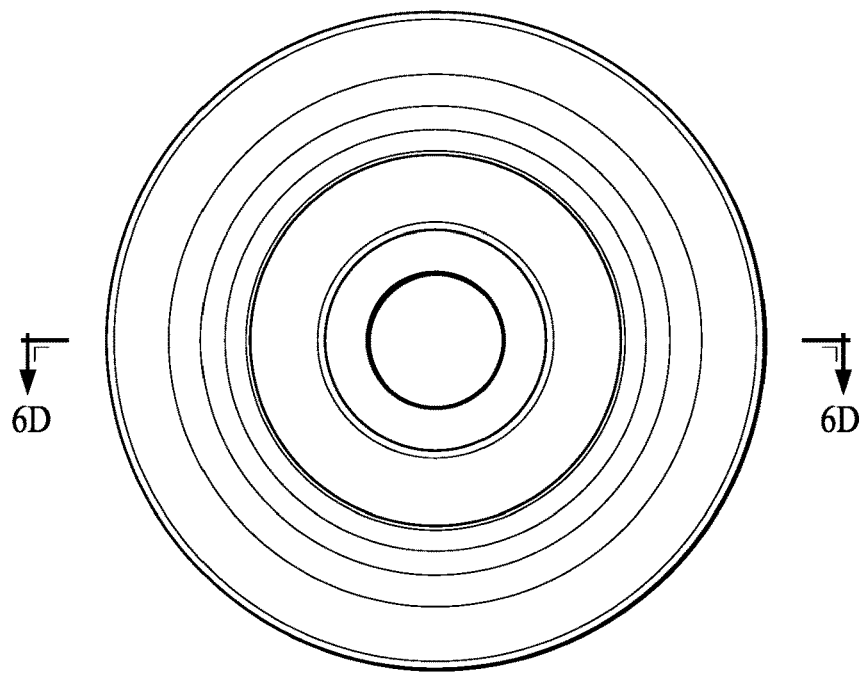
Figure 6D:
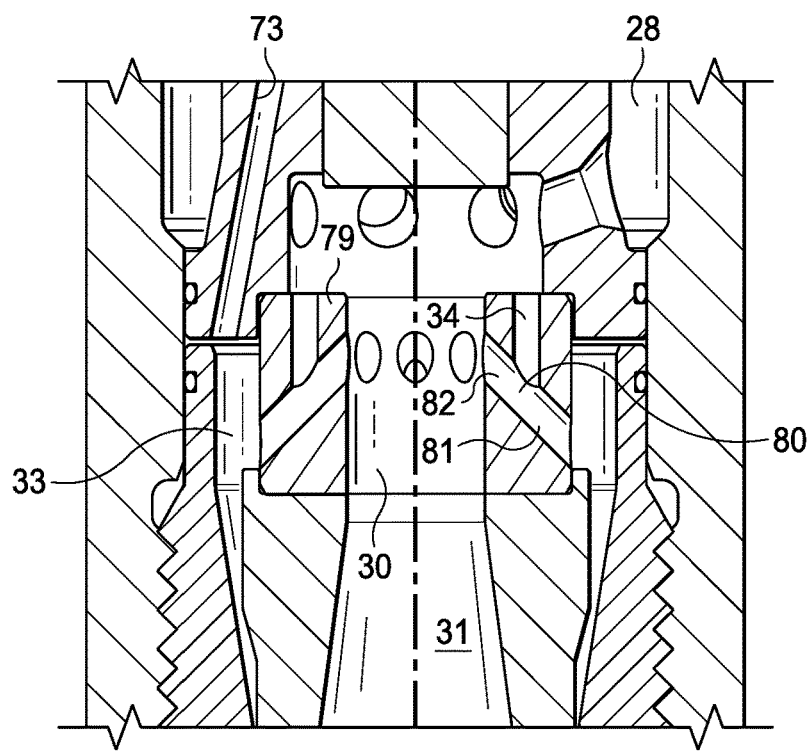
FIG. 6D is a longitudinal cross-sectional view of an alternative exemplary embodiment of the pulse valve poppet section taken along section lines 6D-6D in FIG. 5D; wherein the poppet is in the open condition.

FIGS. 2A-2D, 3, 4, 5A, 5B, 6A, and 6B each illustrate one embodiment of passages that can be configured as part of the poppet seat 13 and seat shell 77. In another embodiment of the present invention, and as illustrated in FIGS. 6C and 6D the passage features described in the first embodiment are connected directly to each other within a single poppet seat 79 component. Bypass passages 34 connects to primary vent ports 81 and secondary vent ports 82; the union of these being a node 80. In this embodiment node 80 functions similarly to intermediate volume 69 in the previous embodiment. Ports 81 and 82 are configured in line with each other, however those skilled in this art will understand that it is possible to alter the configuration of passage size and alignment while still achieving the same connectivity. As before, secondary vent port 82 is connected to Venturi flow restriction 30. When the poppet closes, the resulting elevated pressure causes high velocity fluid to jet through bypass passages 34. The total flow area of bypass passages 34 in relation to the total flow area of secondary vent ports 82 can be chosen so as to create a flow restriction at both 34 and 82 and thus elevating pressure within secondary vent ports 82 relative to downstream of the valve yet less than the pressure upstream of the pulse valve. This intermediate pressure is conveyed through the plurality of passages and volumes as described in the previous embodiment. A variation in this embodiment is to orient the connection of this same set of passages at an angle of 90 degrees or more to each other; 135 degrees being shown in FIGS. 6C and 6D. In these figures, an alternative orientation of ports 81 and 82 is shown such that they are angled in relation to the other connected passages. This configuration can utilize the stagnation pressure of the bypass jets to further increase the vent pressure and decrease the valve actuation pressure during the pulse.

Each of the described configurations takes advantage of the fact that the pressure within the bypass passage is elevated when the valve is closed and the water hammer pulse is generated. This elevated pressure is communicated through the vent ports which reduces the valve actuation pressure during this portion of the cycle. This reduced differential pressure reduces wear and erosion of the internal components and allows for better control over valve actuation characteristics. This is especially true when large sliding seal clearances are used.

Other configurations of these porting connections and restriction can be conceived that accomplish the same thing. The configurations shown here are not meant to be limiting.

The following describes an embodiment of the invention as described herein: a self-piloted, self-cycling pulse valve that incorporates connection of the vent ports and bypass passage before connecting to the region downstream of the pulse.

FIG. 2B shows the hydraulic pulse valve with the poppet open, and pilot 24 still in the lowest position within piston assembly 23. Since the poppet is open, fluid is now able to flow from inlet passage 26 into outlet passage 31 through passages 27, annular passage 28, and passages 29. Accordingly, the differential pressure (i.e., the difference between the fluid pressure at inlet passage 26 and outlet passage 31) is relatively low and is only the result of the resistance to fluid flow through the internal passages and openings of the pulse valve, such as annular passage 28 and passages 29 and 27. However, flow restriction 30 in poppet seat 13 is shaped like a Venturi, causing the fluid flow to accelerate through the throat poppet seat 13. The static pressure in the throat of the Venturi is lower than the pressure in annular passage 28, due to well-known hydrodynamic principles, as taught by Daniel Bernoulli in his book *Hydrodynamica* (1738). It is this pressure differential that causes the elements of pilot 24 and piston assembly 23 (including poppet 25) to move and reclose the valve. Without the Venturi effect of the flow restriction in the throat of the poppet seat, the differential pressure available when the pulse valve is open would be too small to reliably move the piston and pilot. The low pressure caused by the Venturi effect is communicated through multiple flow passages: through secondary vent port 75 into intermediate volume 69, through primary vent ports 32 into annular passage 33, and through flow passages 73 in lower manifold 22 into volume 35. Flow passages 36 in poppet 25 communicate the lower pressure into volume 37 of piston assembly 23, and then into central passage 38 in pilot 24. Since central passage 38 is in fluid communication with an upper volume 40, the low pressure is also communicated from upper volume 40 through radial passages 41 into annular volume 42, which is disposed between an upper annular shoulder of pilot 24 and an upper internal annular shoulder of piston assembly 23. Higher pressure is conveyed through passages 46 from annular passage 28 into closed variable volume 52. The difference in pressure between variable volumes 42 and 52 acts on the pilot to move it upwardly, so that volume 52 opens, as seen in FIG. 2C.

Figure 2C:
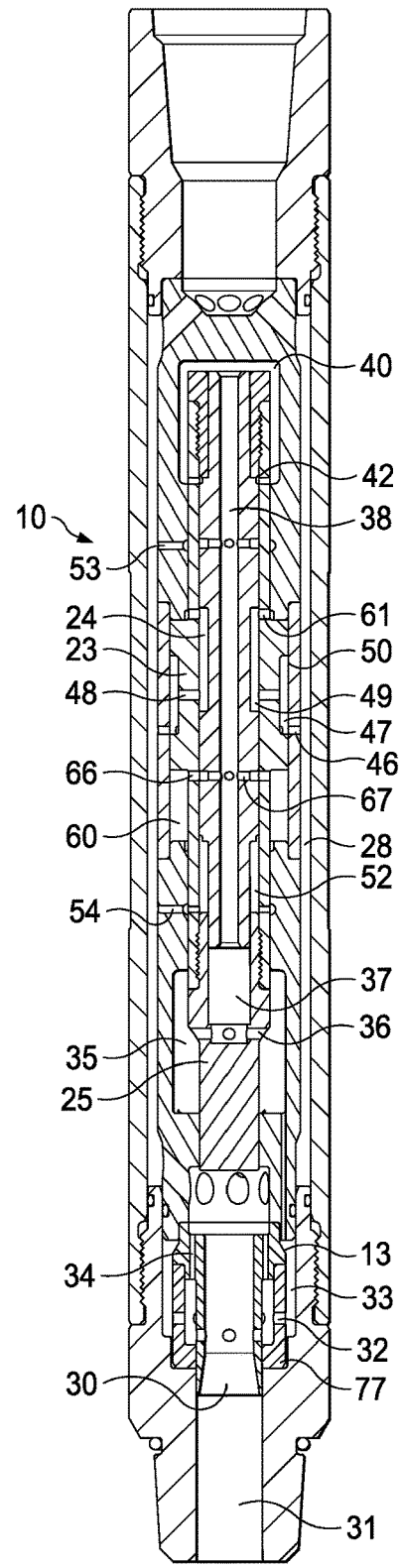
FIG. 2C is a longitudinal cross-sectional view of the pulse valve taken along section lines 2C-2C in FIG. 1C, wherein the pulse valve is shown in an open state, with the pilot shown at its highest position within the piston assembly of the pulse valve.
Figure 1D:
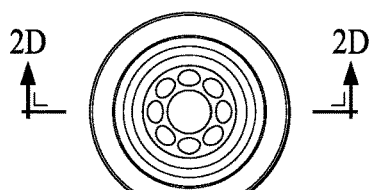

FIG. 2C shows the hydraulic pulse valve with the poppet open and with the pilot in its uppermost position within the piston assembly. Since poppet 25 is open, the differential pressure drop across the pulse valve is low. And, again, there is a much lower pressure created in secondary vent ports 75 and primary vent ports 32 by the Venturi effect of fluid flowing through flow restriction 30, and this low pressure is conveyed through annular passage 33, flow passages 73, volume 35, flow passages 36, volume 37 and central passage 38. Central passage 38 conveys this low pressure into upper volume 40, but because pilot 24 has now moved to its uppermost position, annular volume 42 is closed. The low pressure is also conveyed from central passage 38 through ports 67 in the pilot which align with radial ports 66 in the piston and into piston lower variable volume 60. Also, the current position of pilot 24 communicates the higher pressure in annular passage 28 through radial passage 46 into annular volume 47. Annular volume 47 communicates through radial passages 48 with annular volume 49 that is communicating through radial passages 61 to piston upper variable volume 50, which is currently closed. The differential pressure between variable volumes 50 and 60 urges the piston assembly to begin moving poppet 25 downwardly, to the closed position and partially block fluid flow through outlet passage 31, as illustrated in FIG. 2D.

Figure 2D:
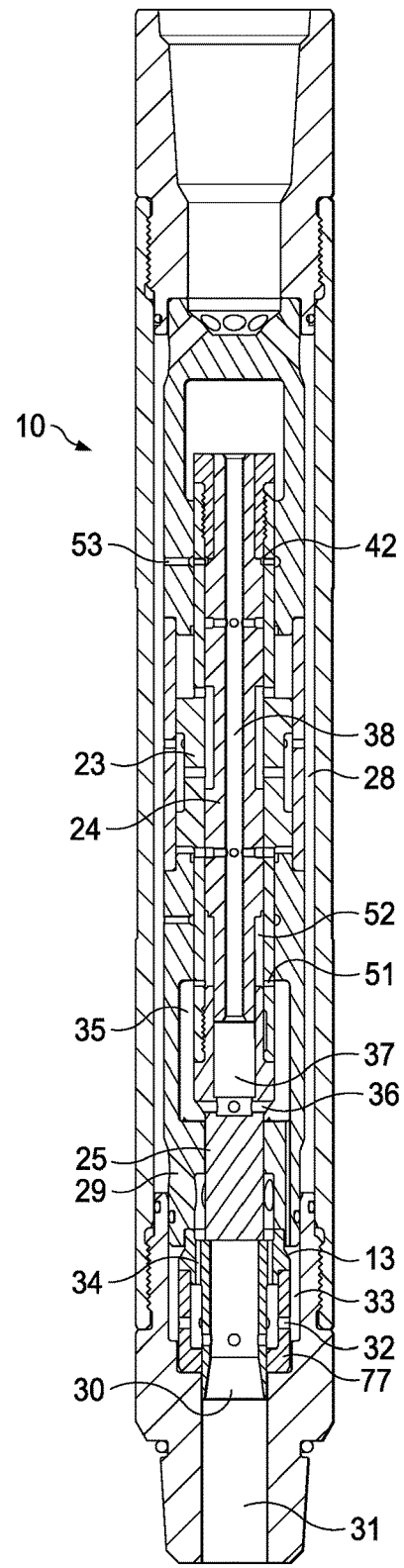
FIG. 2D is a longitudinal cross-sectional view of the pulse valve taken along section lines 2D-2D in FIG. 1D, wherein the pulse valve is shown in the closed state, with the pilot shown at its highest position within the piston assembly of the pulse valve.

Turning now to FIG. 2D, the pulse valve is shown with poppet 25 in its lowest position within the valve body, blocking fluid from flowing from annular passage 28 through passages 29, and with pilot 24 still in its highest position within the piston assembly. Since the pulse valve is closed, the pressure in outlet passage 31 is relatively lower than the pressure in intermediate volume 69 which is lower than in annular passage 28. The intermediate pressure in intermediate volume 69 is conveyed through ports 32 to annular passage 33, flow passages 73, and into volume 35. Again, flow passages 36 in poppet 25 communicate the relatively lower pressure into volume 37 of piston assembly 23 (as shown in FIG. 2C), and then into central passage 38 in pilot 24. From volume 35, the intermediate pressure is conveyed through a radial passage 51 and into pilot lower variable annular volume 52. Higher pressure within annular passage 28 is conveyed through radial passage 53, into pilot upper variable annular volume 42. The differential pressure between variable volumes 52 and 42 tends to urge pilot 24 to move downwardly within piston assembly 23, to the position shown in FIG. 2A.

In one exemplary embodiment, radial passage 53 is restricted in diameter, thereby limiting the fluid flow rate into pilot upper variable volume 42 and slowing the motion of pilot 24. Since poppet 25 is closed during this time, the flow restriction increases the duration of the pressure pulses that are generated by the pulse valve.

The movement of piston assembly 23 and pilot 24 within the valve body then repeats in sequence, as shown in FIGS. 2A-2D, producing a pressure pulse each time that poppet 25 closes the pulse valve, stopping most of the fluid flow though outlet passage 31.

To summarize, from the configuration of FIG. 2A in which poppet 25 is seated on poppet seat 13, interrupting most of the fluid flow through the pulse valve and pilot 25 is disposed at its lowest point within piston assembly, the relatively higher pressure with annular passage 28 (compared to the intermediate pressure in primary vent ports 32) forces the poppet to move upwardly off of poppet seat 13, and opens the pulse valve to all of the fluid flow, as shown in FIG. 2B. The Venturi effect produced by fluid flowing through flow restriction 30 in poppet seat 13 produces a relatively lower pressure, so that the pressure in annular passage 28 can be applied to move pilot 24 upwardly to the top of the valve assembly interior, as shown in FIG. 2C. Then, the pressure in annular passage 28, which is greater than the low pressure caused by the Venturi effect of fluid flowing through flow restriction 30 in poppet seat 13, urges poppet 25 downwardly, partially blocking fluid flow through poppet seat 13, as shown in FIG. 2D. For each change of position of pilot 24 and poppet 25, it is the differential pressure in the various passages and volumes of the valve assembly that provide the fluid pressure force to move the poppet and pilot components, thereby changing the flow paths through the valve assembly, to repetitively produce pressure pulses.

The pulse frequency of the pulse valve is controlled by the fluid flow rate through the pulse valve. The fluid flow rate can be controlled by controlling the speed/volume of the pump that supplies pressurized fluid down hole. A higher flow rate produces a higher pulse frequency, so increasing the speed of the pump and/or its volumetric rate can increase the pulse frequency. Furthermore, a range of tools may be attached to the lower adaptor of the pulse valve, depending on the type of work to be done, and the application in which the pulse valve is to be employed.

Figure 4:
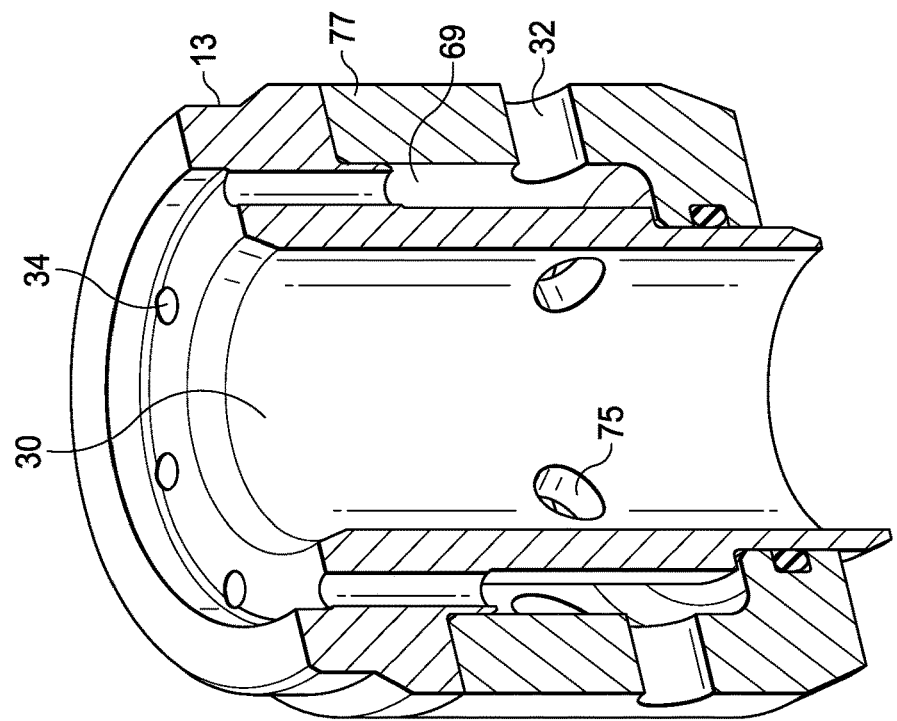
FIG. 4 is a cross-section side elevational view of an alternative embodiment of a pulse valve poppet seat and seat shell of FIGS. 1A-1D and 2A-2D and FIG. 3.
Figure 3:
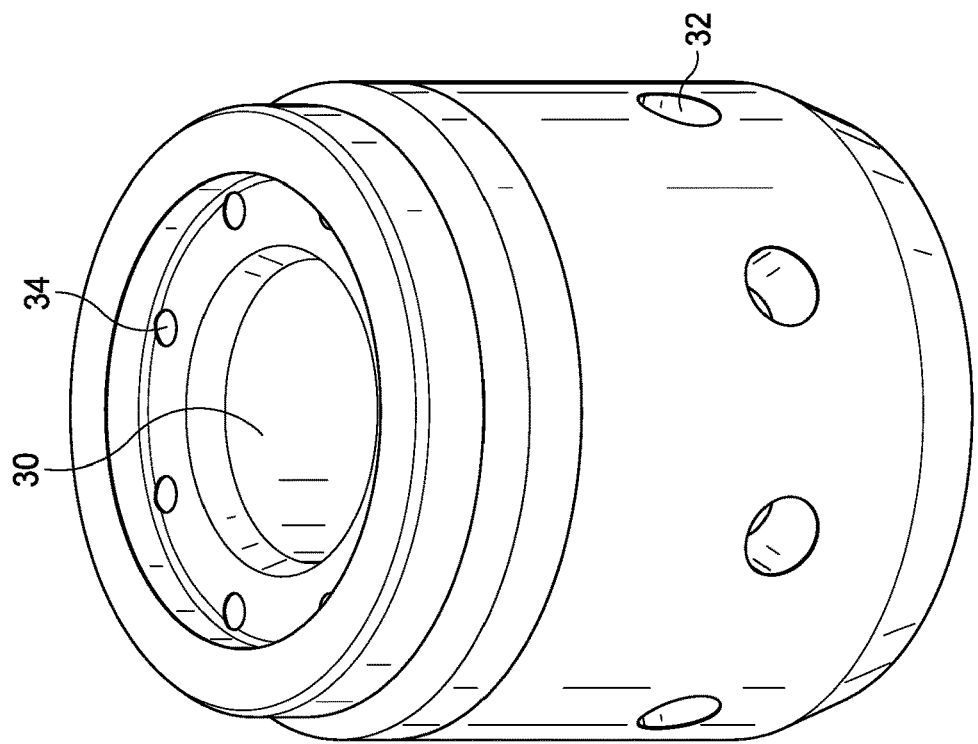
FIG. 3 is a side elevational view of an alternative embodiment of a pulse valve poppet seat and seat shell of FIGS. 1A-1D and 2A-2D.
Figure 5A:
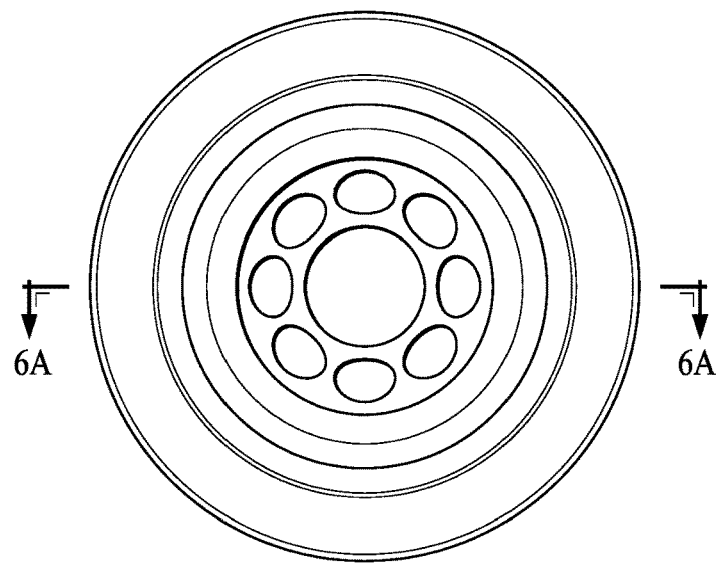
FIGS. 5A and 5B are identical plan views of the bottom of an exemplary pulse valve poppet section in accord with the present novel approach.
Figure 5B:
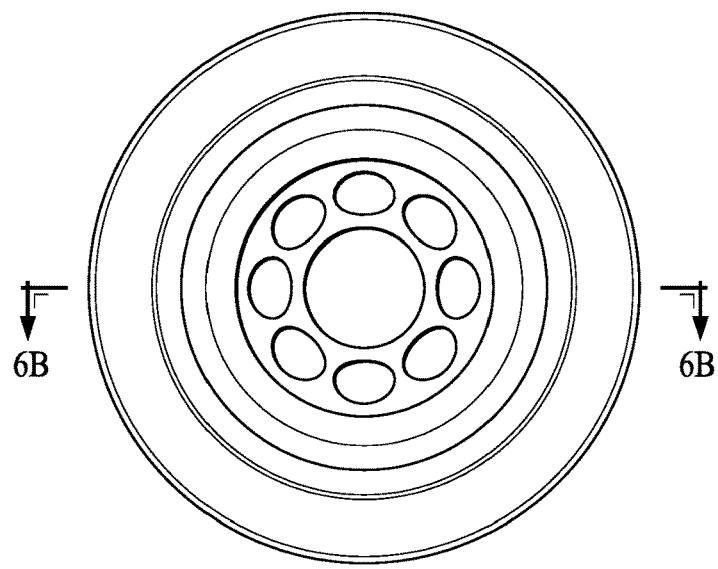
Figure 5C:
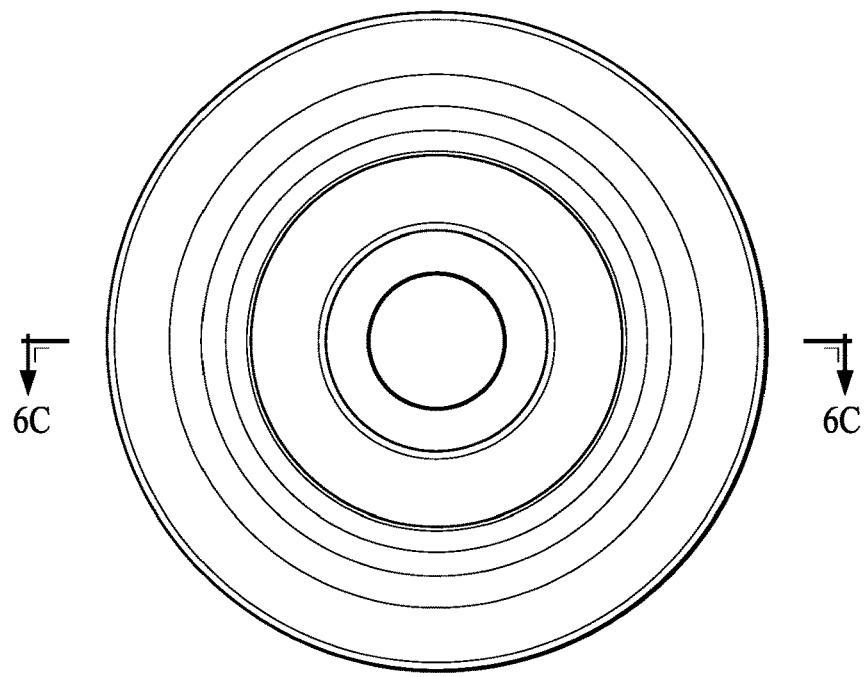
FIGS. 5C and 5D are identical plan views of the bottom of an alternate exemplary pulse valve poppet section in accord with the present novel approach.

FIG. 3 shows an isometric view of an exemplary embodiment of poppet seat 13 and seat shell 77. FIG. 4 shows a cross-sectional view of the same embodiment. Primary vent port 32 is shown in detail as well as the primary flow restriction 30, secondary vent ports 75, bypass passages 34, and intermediate volume 69.

Figure 7:
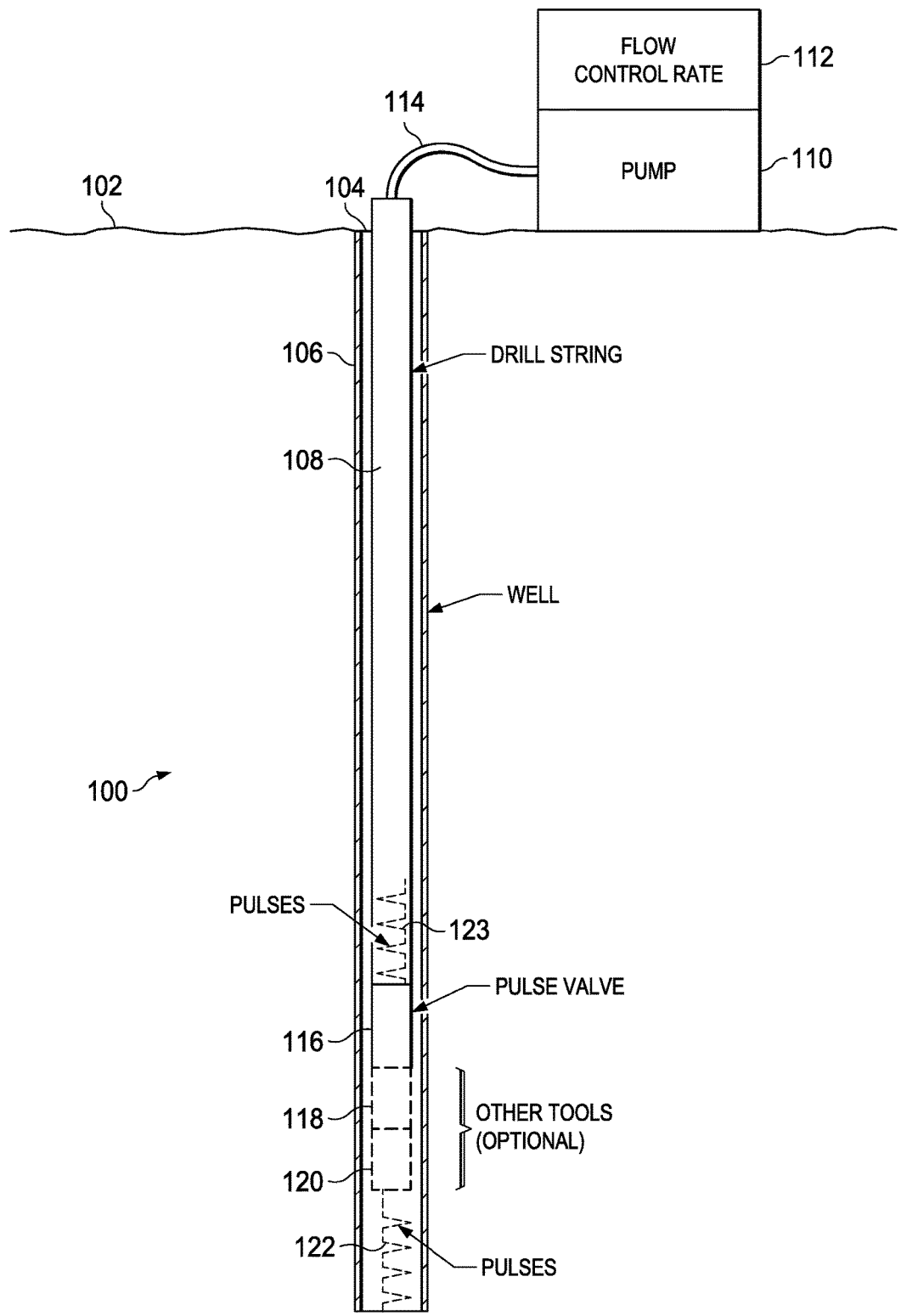
FIG. 7 is a schematic cross-sectional view of a borehole and drill string in which the exemplary pulse valve described herein is installed.

FIG. 7 is a schematic cross-sectional view 100, illustrating a ground surface 102 on which a well-head 104 of a well or borehole 106 is disposed. A conduit 108 extends from well-head 104 down into borehole 106. On surface 102 is disposed a pump 110 that is controlled by a flow rate control 112, which can vary the speed of the pump to achieve a desired flow rate of fluid into the conduit through a fluid line 114. The fluid circulated under pressure into the conduit is a relatively incompressible liquid, such as drilling mud or water, although other liquids might be used, including a mixture of a liquid and a gas, depending upon the application and its requirements. The conduit may be continuous coiled tubing or jointed tubing. Near the distal end of conduit 108 is disposed a pulse valve 116, which is optionally part of serial string of tools and is configured and functions like the exemplary embodiment described above. Optionally, below (or above) pulse valve 116 is disposed one or more other tools 118 and/or 120 which may be employed. The specific tool(s) and function of pulse valve 116 depend on the application for which the drill string and pulse valve are being used. Examples of the well-known applications of pulse valves are listed above.

Pulse valve 116 can also produce a relatively longer duration pressure pulses (relative to earlier designs), which increases the impulse and energy of each pulse and effective propagation range of the pressure pulses. The longer pulse duration is the direct result of reduced differential pressure actuating the valve during the pulse as discussed above. The use of a flow restriction in flow passage 53 (as shown in FIG. 2D) further increases the pulse width by slowing the flow of the pressurized fluid that moves the pilot. The length of the travel of the pilot may also be increased to increase the pulse duration; however, this approach leads to increased cost for the pulse valve, since the increased travel length requires longer parts.

A novel aspect of the present pulse valve is its use of the Venturi effect arising from the flow of fluid through the restricted throat of the poppet seat to provide a differential pressure used to operate the pulse valve, i.e., to move the pilot between the upper and lower positions, and to close the pulse valve by moving the poppet into its closed position within the poppet seat. In addition, the cycle rate or pulse frequency of the pulse valve can readily be reduced by reducing the flow rate of the fluid through the pulse valve, to enable seismic interpretation and pore pressure prediction when the tools are used as a seismic source. Further, it is possible to control the impulse amplitude of the pressure impulses produced by the pulse valve by increasing or decreasing the size of the bypass passages, while maintaining pulse duration and cycle rate.

Figure 8A:
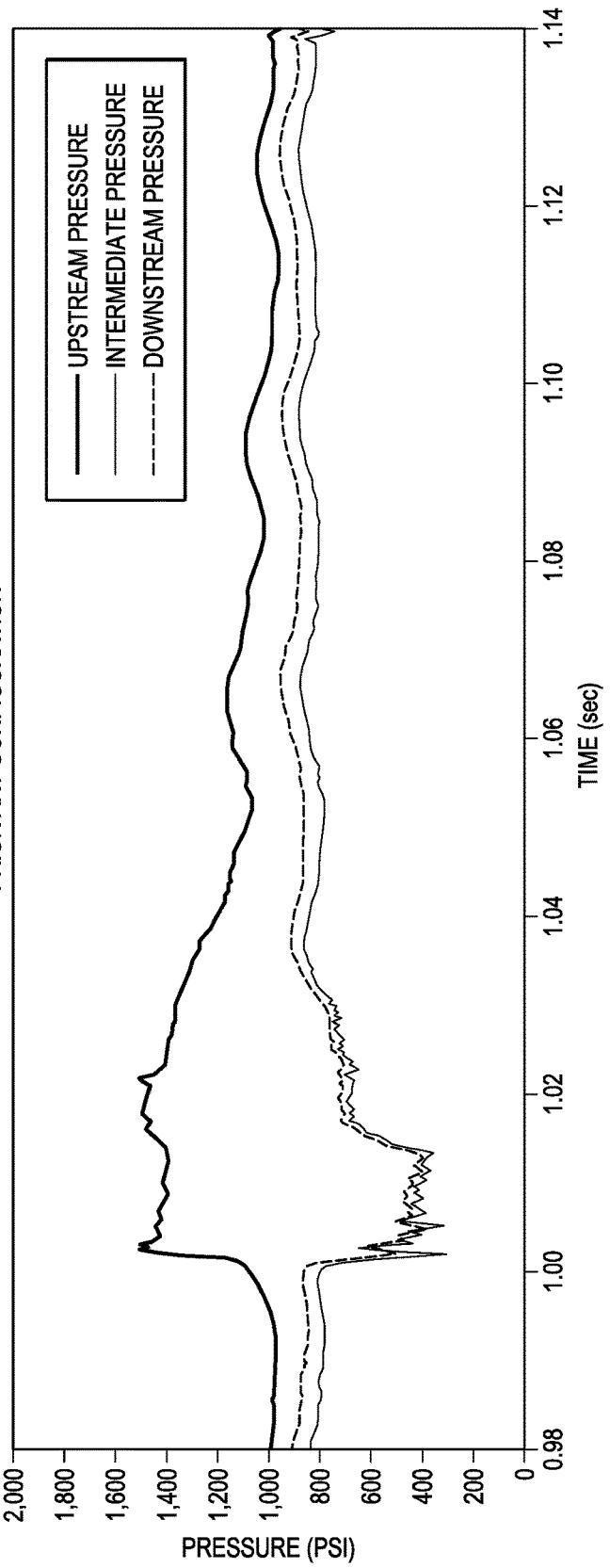
FIG. 8A is a graph illustrating exemplary upstream, intermediate, and downstream pressure pulses produced by the pulse valve of an earlier configuration.
Figure 8B:
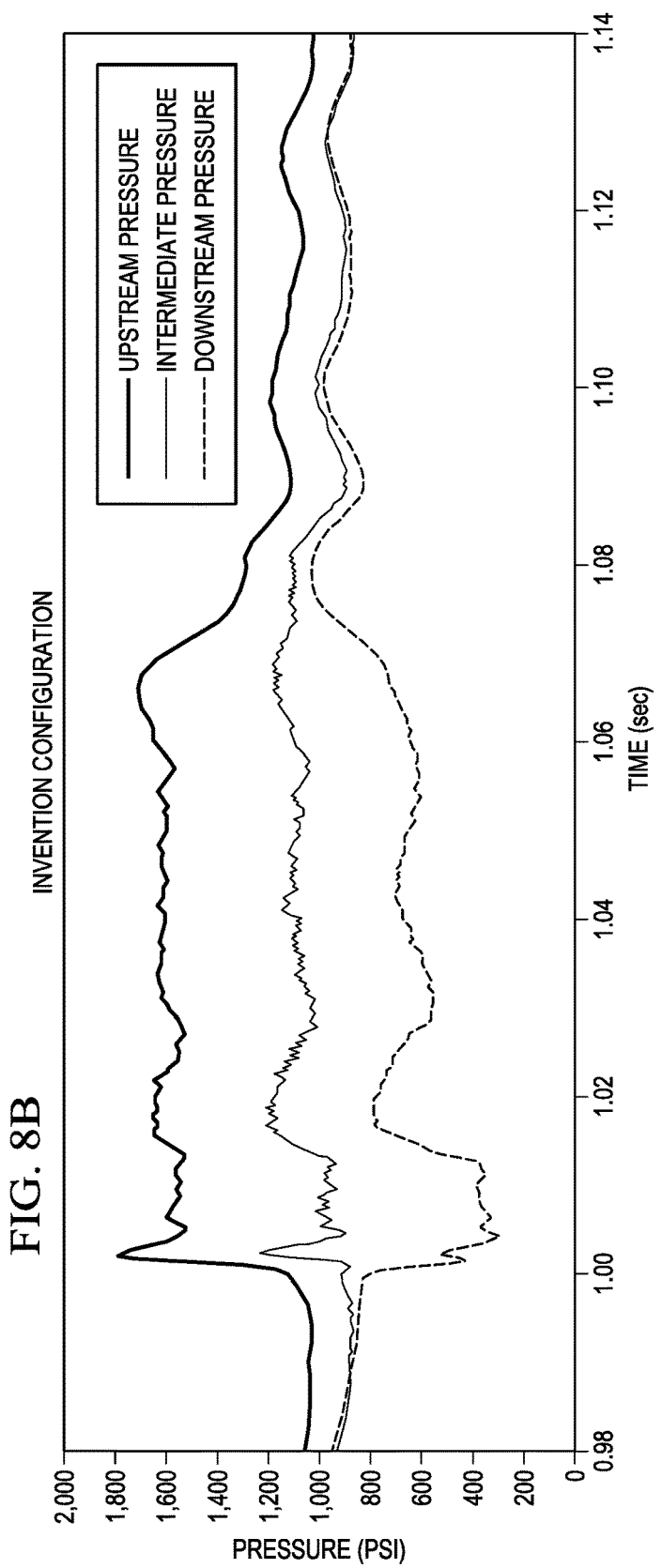
FIG. 8B is a graph illustrating exemplary upstream, intermediate, and downstream pressure pulses produced by the pulse valve configuration illustrated in FIGS. 2A-2D.

FIG. 8A depicts a graph illustrating exemplary upstream, intermediate, and downstream pressure pulses produced by the pulse valve of an earlier configuration such as that described in U.S. Pat. No. 8,528,649. FIG. 8B depicts a graph illustrating exemplary upstream, intermediate, and downstream pressure pulses produced by the pulse valve described herein, such as the pulse valve illustrated in FIGS. 2A-2D. For both FIGS. 8A and 8B the flow rate was about 124 gpm. FIG. 8C is a graph illustrating an exemplary actuation pressure comparison for the pulse valve configuration illustrated in FIGS. 2A-2D as compared to prior designs. As is shown the actuation pressure from the prior to the new design has seen a reduction of approximately 40% and similar reductions would be expected for other similar configurations.

In an embodiment, for the newly described pulse valve configuration, at least one benefit expected is increased propagation due to longer pulses and more conveyed pulse energy. An additional benefit that has been observed with this new pulse valve configuration is a reduction in undesirable mechanical impact force that results from the poppet closing.

Figure 9:
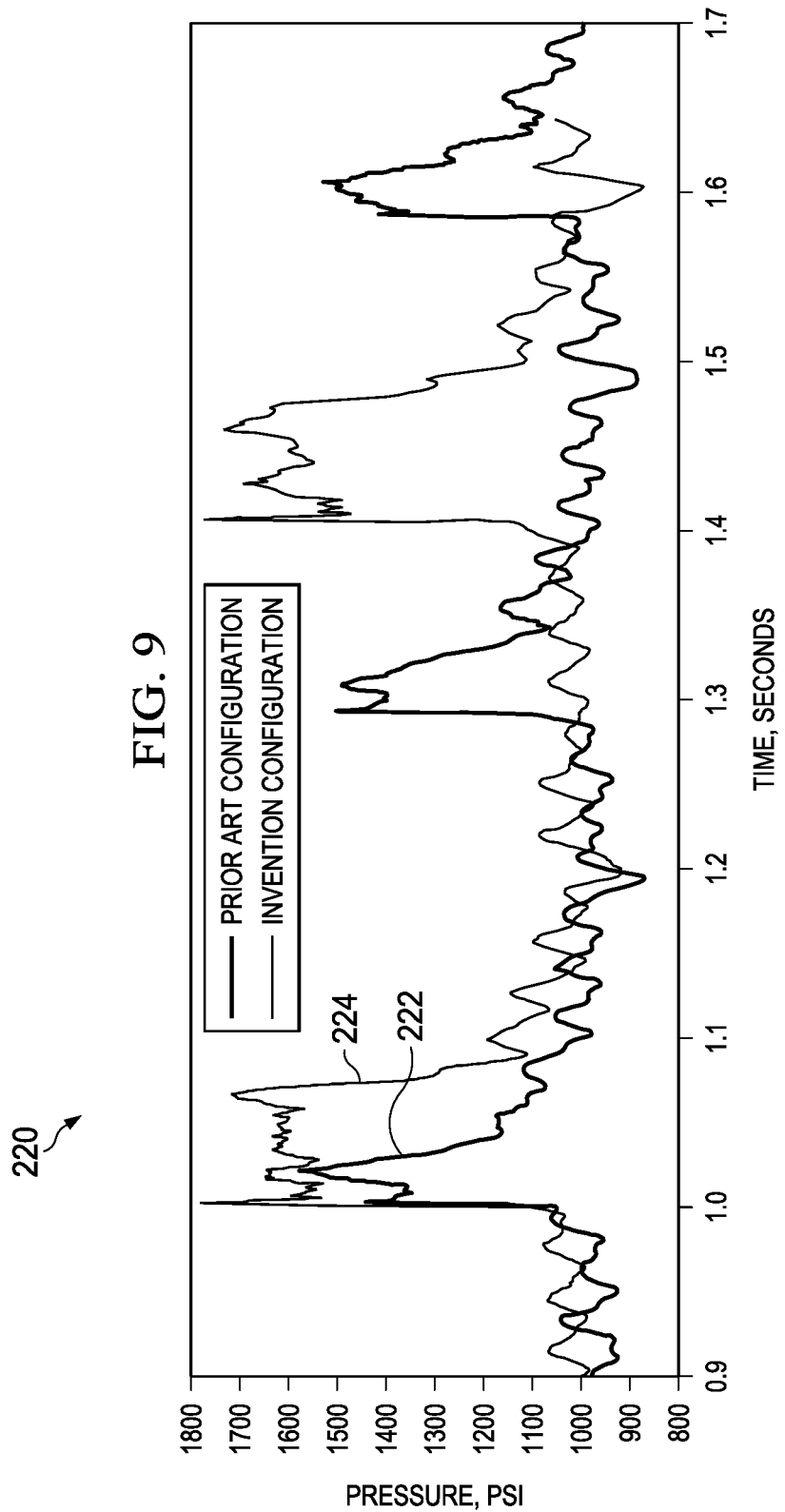
FIG. 9 is a graph illustrating an exemplary upstream pressure comparison for the pulse valve configuration illustrated in FIGS. 2A-2D as compared to prior designs.

FIG. 9 is a graph 220 that shows the effect of the invention configuration on pressure above (upstream) of the pulse valve. An exemplary pulse 224 produced by the invention configuration (about 0.09 seconds long) is roughly twice as long as an exemplary pulse 222 (about 0.04 seconds long) produced by a pulse valve that incorporated a poppet seat of an earlier design, but was otherwise the same pulse valve. The pulse pressure of 224 (about 1,600 psi) is somewhat higher than 222 (about 1,400 psi) which can be attributed to difference in the effective flow characteristics through bypass passage 34 relative to the earlier poppet seat configuration. The time between pulses (0.30 vs. 0.25 seconds) is somewhat longer which is due to a slightly lower actuation pressure when the poppet is open. The longer pulse and longer time between pulses causes a slower pulse valve cycle rate.

The energy contained in a pressure pulse is directly related to the area under the pressure curve in the time domain relative to the average pressure that exists during the time between the pulses (nominal pressure). It can be seen that the area under pulse 224 is substantially more than that of 222 which could provide the several benefits described herein.

FIGS. 10A-10C include three schematic views 240 that illustrate how an exemplary pulse valve 246 as described above may be used as an engine to pull a long length of tubing 242 having components 248, such as a motor and mill, jetting nozzle, logging tool, or perforating gun array at its distal end, into a generally horizontal well. When a fluid flow 244 in tubing 242 is mostly interrupted by the pulse valve, a tensile load is introduced into the tubing by pulses 252, causing it to stretch. In a typical configuration, the pulse duration is on the order of 70 ms, which is the time that the pulse valve is closed, while the period between pulses is about 300 ms, or the interval during which the pulse valve is open. When the tubing stretches, as indicated by reference numeral 250, the distal end of the tubing moves forward within the well, e.g., by about one inch, as indicated by a reference number 254. When the pulse valve opens again, the hydraulic pulse engine stops moving, but strain pulses 252 propagate up the tubing, causing the entire tubing string to again move forward a small amount, as indicated by reference numeral 256. In a typical application, the motion of the tubing string is on the order of one-inch per pulse, as indicated. The upper end of the tubing is connected to a hoist system in the case of jointed tubing, or to a heavy reel of coiled tubing that constantly feeds the tubing into the well (neither shown). This surface system is massive and absorbs the strain energy pulse, so that it is not reflected back down the well.

FIGS. 11A-11C include three schematic illustrations 270 that show how an exemplary pulse valve 280, which is configured and operates as discussed above, may be used to enhance the placement of chemicals, such as an acid 278 that is flowing through tubing 272. The acid is thus forced into a formation 276 surrounding a wellbore 274. In this application of the pulse valve, the upper end of the wellbore is closed so that all of the fluid (e.g., the acid) is forced into the surrounding formation by pressure pulses 284. Mostly interrupting the flow of fluid generates an upstream pressure pulse 282 that stores considerable energy. When the pressure pulse is released, the flow of fluid into the wellbore is substantially greater than the average flow rate of the fluid being pumped, which results in cyclic surging of the flow of the fluid into the formation. The pulse valve thus aids acid placement in the surrounding formation. This same approach can also be used for forcing other types of fluid into the formation around a well.

In the event that the wellbore is open to allow circulation, the surge of fluid introduced into the well causes a surge in the flow velocity in the annulus around the drill string. This flow surge can be used to enhance the transport of sand or other debris out of the horizontal and inclined sections of the wellbore.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A downhole pulse valve for producing pressure pulses within a conduit, comprising:
    (a) an elongate housing with a central longitudinal axis and comprising:
        (i) an inlet disposed on one end of the housing, said inlet being configured to couple to a source of pressurized fluid;
        (ii) an outlet disposed on an opposite end of the housing, said outlet being configured to convey the pressurized fluid out of the housing;
        (iii) an internal passage with a first inner diameter for conveying a pressurized fluid between the inlet and the outlet;
        (iv) a poppet seat disposed adjacent to the outlet of the housing; and
    (b) a valve assembly disposed within the elongate housing, the valve assembly comprising:
        (i) a poppet that is reciprocally movable between a closed position in which it partially blocks pressurized fluid from flowing through the poppet seat, and an open position in which it does not block the flow of pressurized fluid through the poppet seat;
        (ii) a pilot that is disposed within the poppet and reciprocates between disparate first and second positions to alter fluid communication paths within the valve assembly;
        (iii) a plurality of fluid passages that are configured in fluid communication based upon positions of the pilot and of the poppet within the valve assembly, the pilot and the poppet moving in response to differential pressures developed in the valve assembly, and
    (c) the poppet seat further comprising:
        (i) a substantially cylindrical body comprising an outer surface and an inner throat with a second inner diameter smaller than the first inner diameter of the internal passage within the elongate housing;
        (ii) a fixed internal volume radially disposed between the outer surface and the inner throat;
        (iii) one or more bypass passages configured to allow a portion of the pressurized fluid to flow into the fixed internal volume when the poppet is in the closed position;
        (iv) one or more vent ports configured to allow pressurized fluid to flow radially outward from the fixed internal volume and to pass through one or more of the plurality of fluid passages within the valve assembly to a variable volume within the housing at a location axially disposed between the poppet seat and the inlet of the housing.

2. The downhole pulse valve of claim 1, wherein the poppet seat further comprises secondary vent ports configured to allow a portion of the pressurized fluid to flow from the fixed internal volume into the inner throat.

3. The downhole pulse valve of claim 1, wherein the poppet seat further comprises:
   (a) an annular seat against which the poppet abuts when in the closed position;
   (b) a substantially cylindrical seat shell in axial abutment with the annular seat; and
   (c) the inner throat in radial abutment with the annular seat and the seat shell.

4. The downhole pulse valve of claim 3, wherein the bypass passages are radially disposed between the inner throat and the annular seat.

5. The downhole pulse valve of claim 3, wherein the fixed internal volume is radially disposed between the inner throat and the seat shell.

6. The downhole pulse valve of claim 1, wherein the outlet of the housing is configured to convey the pressurized fluid to a component that is coupled to the housing.

7. The downhole pulse valve of claim 1, wherein the outlet of the housing is configured to convey the pressurized fluid directly into a wellbore within which the housing is located.

8. The downhole pulse valve of claim 7, wherein the outlet of the housing comprises one or more nozzles.

* * * * *